Figure 1:
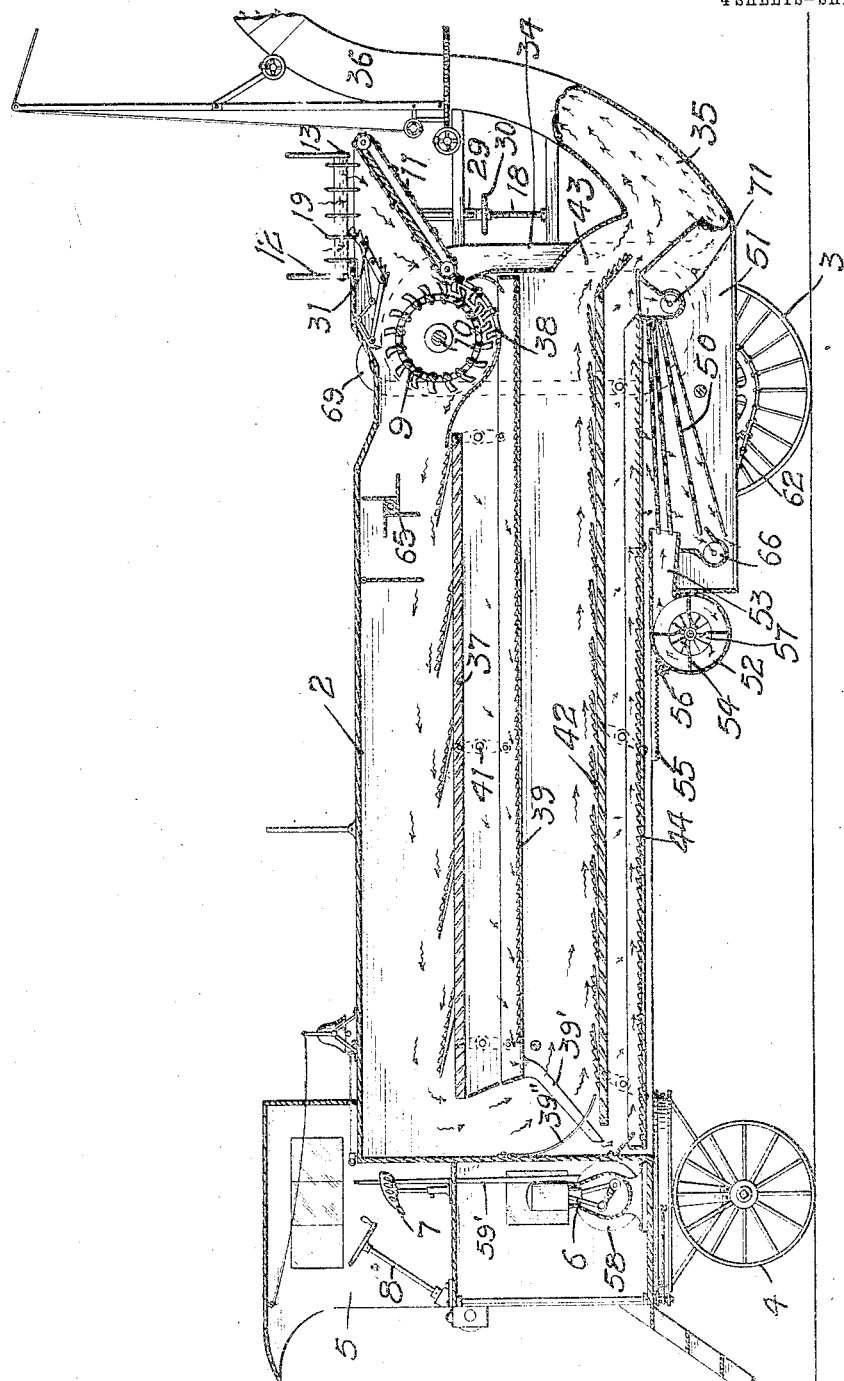

H. O. SAGENG.
THRESHING MACHINE.
APPLICATION FILED MAY 4, 1908.

931,347.

Patented Aug. 17, 1909.
4 SHEETS—SHEET 1.

WITNESSES

INVENTOR
HALVOR O. SAGENG
BY Paul & Paul
HIS ATTORNEYS

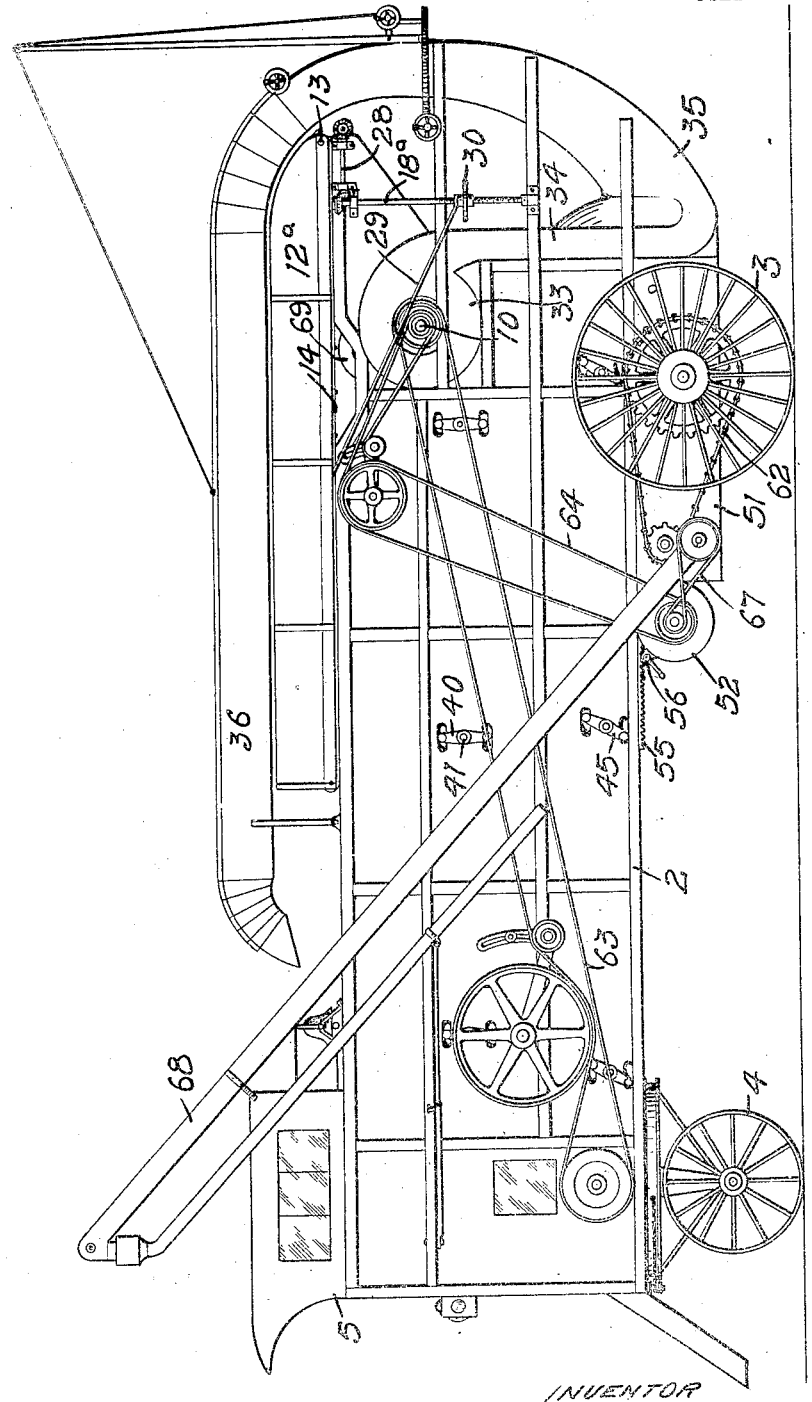

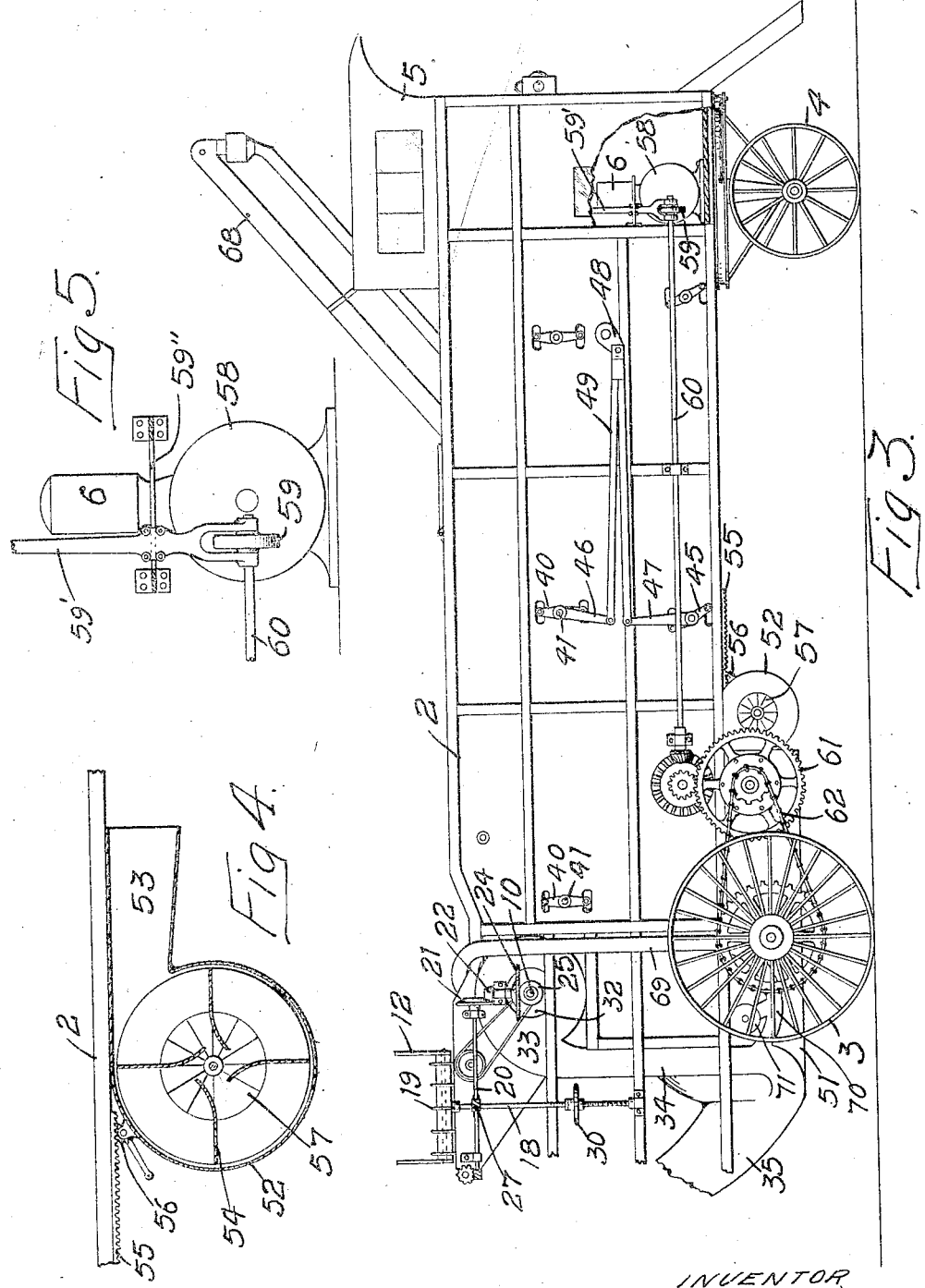

H. O. SAGENG.
THRESHING MACHINE.
APPLICATION FILED MAY 4, 1908.
931,347.
Patented Aug. 17, 1909.
4 SHEETS—SHEET 4.
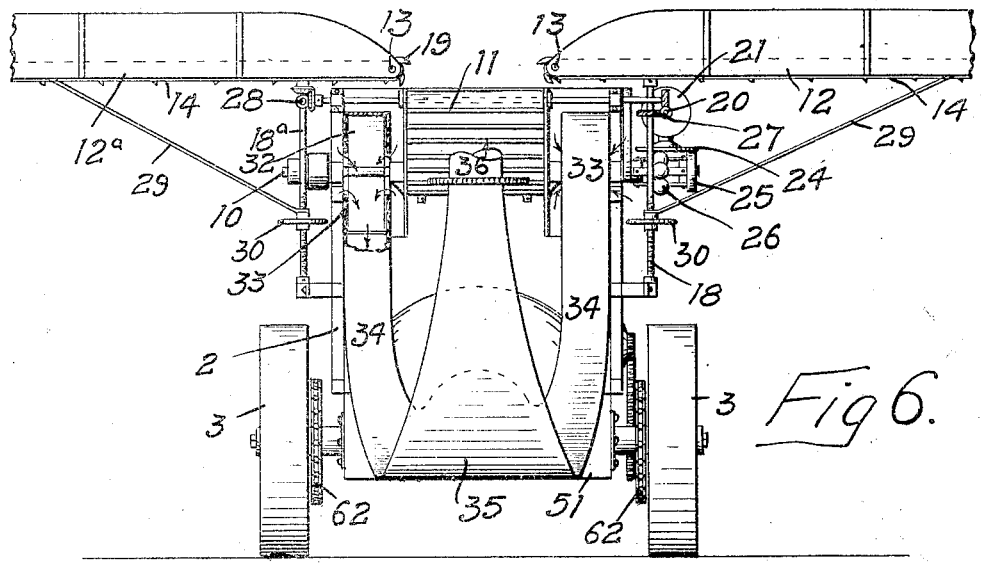
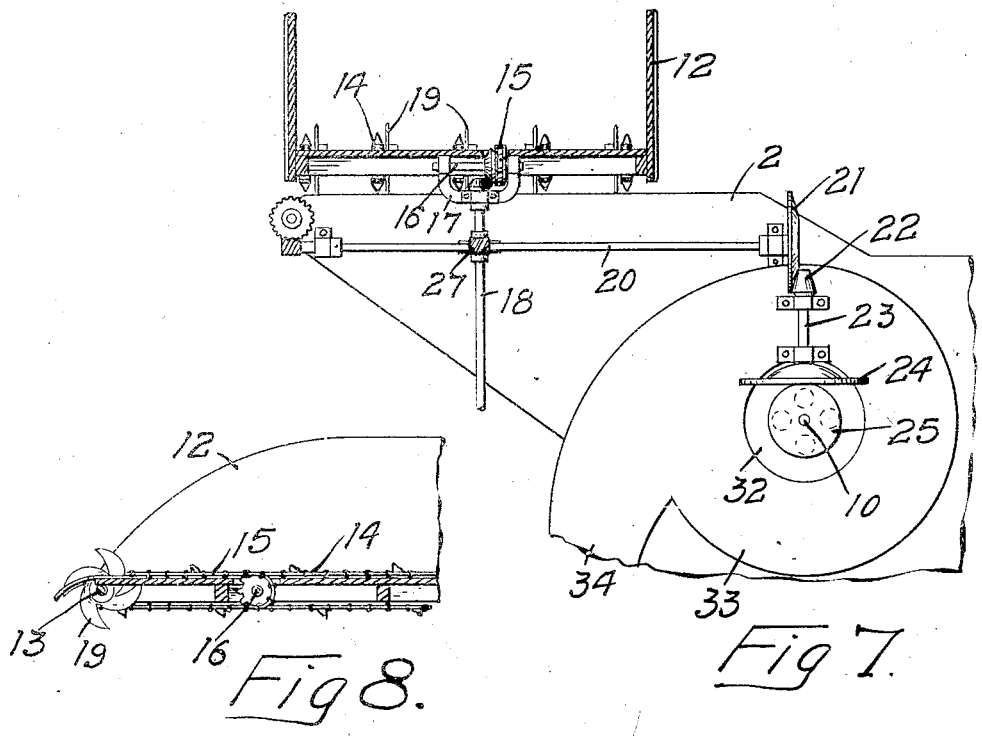
WITNESSES
INVENTOR
HALVOR O. SAGENG
BY Paul & Paul
HIS ATTORNEYS

UNITED STATES PATENT OFFICE.

HALVOR O. SAGENG, OF DALTON, MINNESOTA.

THRESHING-MACHINE.

No. 931,347.　　　　Specification of Letters Patent.　　Patented Aug. 17, 1909.

Application filed May 4, 1908. Serial No. 430,679.

*To all whom it may concern:*

Be it known that I, HALVOR O. SAGENG, of Dalton, Ottertail county, Minnesota, have invented certain new and useful Improvements in Threshing-Machines, of which the following is a specification.

The object of my invention is to provide a separator which will eliminate the use of a traction engine for threshing purposes and therefore greatly reduce the cost and weight of a threshing outfit.

A further object is to embody a threshing outfit within a single machine of simple construction and easy of manipulation both on the road and in the field.

A further object is to reduce the cost of operating a threshing outfit by providing a machine capable of being operated by a single operator, dispensing entirely with three or four men usually required around an apparatus of this kind.

A further object is to provide a separator capable of being pulled up to a stack while in operation, thus saving time in setting the machine and also doing away with the necessity of several additional men usually required in getting the threshing outfit set up ready for operation and supplied with bundles.
A further object is to provide a separator having a large capacity and one that will be very efficient in the threshing and separating of the grain.

The invention consists generally in the construction in which the cylinder, concave and stacker tube are located at the same end of the machine, and return racks arranged in relation thereto so as to have the receiving end of the straw rack toward the concave to receive the straw therefrom, and the return rack disposed beneath the first rack and having its receiving end at the end of the casing opposite to where the feeder and concave are located and its discharge end at the feeder and concave end of the casing.

It further consists in having the cylinder, concave and stacking device located at the end of the casing opposite to the end where the motor is located so as to relieve the motor from the influence of the dust and tailings delivered to the stacker, together with return racks so disposed as to carry the straw from one end to the other of the casing and then back to the receiving end where the cylinder, concave and stacker are located.

Further the invention consists in locating the cylinder and blower at the rear end of the machine at a distance from the engine and cab.

Further the invention consists in various constructions and combinations, all as hereinafter described and particularly pointed out in the claims.

In the accompanying drawings, forming part of this specification, Figure 1 is a longitudinal vertical sectional view of a threshing machine embodying my invention. Fig. 2 is a side elevation of the same. Fig. 3 is a similar view of the opposite side of the machine. Fig. 4 is a detail view showing the construction of the blast fan or blower. Fig. 5 is a detailed view illustrating the governor. Fig. 6 is an end view of the machine partially in section showing the connection between the stacker tube and the blast fans or blowers. Fig. 7 is a sectional view illustrating the mechanism for controlling the feed to the threshing cylinder. Fig. 8 is a detail sectional view illustrating the band cutting mechanism at the delivery end of the bundle carrier belt.

In the drawing, 2 represents the casing of the separator having carrying wheels 3 and 4, and a cab 5 at the forward end beneath which is located an engine 6 for driving the mechanism of the machine. A seat 7 is provided in the cab above the engine, and a steering post 8 is operatively connected with the axle of the wheels 4. The threshing cylinder 9 is located at the rear end of the machine and near the top of the casing and has a shaft 10 projecting out on each end of the cylinder.

The feeder which I prefer to employ consists of a three-part combination comprising a central downwardly inclined belt 11 in the rear of the middle portion of the cylinder, and pivoted feeder arms or frames 12 and $12^a$ located on each side of the belt 11 and adapted to deliver the grain thereto. Shafts 13 are mounted in the frames 12 and $12^a$ and feeders consisting of a series of belts 14 are arranged in said frames and are driven from belts 15 on shafts 16 mounted in yokes 17 on the upper ends of rods 18 and $18^a$. The shafts 16 are geared to the upper ends of the rods 18 and $18^a$. The yokes have a swiveled connection with the said rods and allow the frames to be swung at any desired angle to the central feeder so that regardless of the position of the stack the operator can adjust the feeder arms in the desired position to deliver the grain to the central belt. A series of band cutters 19 are mounted on the shafts 13 to cut the bundle bands as they are delivered to the central feed. The rods 18 and 18ª are driven from a shaft 20 having a friction disk 21 in contact with a cone 22 on a shaft 23 that carries a disk 24. This disk 24 is in engagement with a disk 25 slidably mounted on the shaft 10 of the threshing cylinder 9 and connected with the usual centrifugal governor mechanism 26 that is operated by the revolution of the cylinder shaft. When the speed of the cylinder increases above a predetermined point the disk 25 will slide inwardly on the shaft and contact with the disk 24 near the center thereof, thereby increasing the speed of the shaft 20 and the feeders operated therefrom. When the speed of the cylinder decreases the disk 25 will slide outwardly on the shaft and contact with the disk 24 near its periphery and allow the speed of the feeders to decrease with the reduction in speed of the threshing cylinder. The rod 18 has a worm drive 27 with the shaft 20 and a shaft 28 is driven from the shaft 20 through the shaft of the central feeder and is geared to the upright rod 18ª. Both feeders will thus be operated simultaneously and the frames may be swung in a horizontal plane to adjust the feeders conveniently to the stack. For the purpose of raising and lowering the feeder frames rods 29 are provided having one end adjustable on the rods 18 and 18ª by means of the wheels 30 having their hubs threaded on said rods. The feeder frames being independent of one another can be raised for different elevations to suit the convenience of the man supplying the bundles.

Kickers 31 are arranged to overhang the central feed belt and aid in spreading the grain thereon and retard somewhat its delivery to the threshing cylinder. The shaft 10 of the threshing cylinder projects beyond each end thereof and upon said projecting ends I mount blowers 32 within casings 33 from which spouts 34 lead downwardly into a trunk 35 which communicates with a stacker tube 36 that is arranged to revolve in the usual way. The arrangement of these blowers on the cylinder shaft eliminates entirely the separate blower belt and special boxes for the blower shaft and also prevents contact of the blower fan with the straw, thus avoiding all unnecessary friction and loss of power. The blowers arranged in this way will supply a continuous stream of cool air to the cylinder boxes preventing them from heating, and drawing in and discharging all dirt and dust raised by and accumulating around the cylinder. The connection of the governor directly with the cylinder shaft renders it extremely sensitive and affected by the slightest irregular motion of the cylinder causing a change in the speed of the feeders commensurate with that of the cylinder. As the speed of the cylinder increases and its capacity for threshing is correspondingly augmented the travel of the device will increase also, a decrease immediately following any reduction in the speed of the cylinder.

Within the casing 2 is a straw rack 37 having its receiving end in position to receive the straw from the concave 38. A grain pan 39 is arranged below the straw rack and a series of links 40 are pivotally connected to said rack and pan and supported at 41 on the side wall of the casing. A return straw rack 42 is arranged below the pan 39 and has its discharge end contiguous to an opening 43 leading to the trunk 35. A return grain pan 44 is arranged beneath the rack 42 and connected therewith by links 45 also mounted on the wall of the casing. At the end of the grain pan 39 I provide downwardly inclined spouts 39' adapted to receive the grain and deliver it to the return pan 44, and fingers 39" are located above the outside ends of the spouts 39' for the purpose of directing the straw from the rack 39 upon the return rack 42. A vibrating movement is imparted to the forward and return racks and pans by means of arms 46 and 47 connected to one of the links 40 and 45 and operated from a crank 48 through a forked connecting rod 49. This arrangement allows one rack and pan to counterweight or balance the other rack and pan and facilitate their operation. By providing the return straw rack and pan, I am able to increase the effective length of the grain-cleaning mechanism of the machine, without increasing the length of the machine itself. The use of this return rack also allows me to locate the cylinder and stacker tube at the same end of the machine and remove therewith the dust and dirt incidental thereto the full length of the machine from the source of power, which in this case, is the gas engine contained within the cab at the opposite end of the machine. I regard therefore, this arrangement of the cylinder and stacker tube as an important feature of my invention. The discharge end of the grain pan 44 is near the entrance 43 to the spout 35 and above a series of sieves 50 arranged within a casing 51. A fan casing 52 has a spout 53 arranged to direct a blast over and through the sieves 50 from a fan 54, said fan and casing being adjustable toward and from the sieves by means of a rack 55 and pinion 56. A series of blades 57 are mounted on the shaft of the fan and are adapted to create a suction and increase the volume of air flowing into the fan casing.

The traction mechanism is driven from a disk fly wheel 58 on the motor shaft through a friction wheel 59 and shaft 60 geared to a wheel 61 having a belt drive 62 with the rear wheels. A controlling lever 59' is connected with the shaft 60 and is movable on a guide bar 59". By the movement of this lever the wheel 59 may be moved into or out of engagement with the disk 58 and also the adjustment of the wheel 59 toward and from the center of the disk 58 can be regulated for the purpose of increasing or decreasing the speed. On the other side of the machine a similar belt drive is provided and a belt 63 drives the threshing cylinder from the motor. A belt drive 64 connects the cylinder shaft, the shaft of the beater 65 and the shaft of the blower 54. A transverse conveyer 66 is located under the spout 53 and has a belt connection 67 with the blower 54 and an elevator 68 is connected with said conveyer.

A chaff elevator 69 is provided above the rear axle on one side of the machine and communicates through a branch spout 70 with the depending blower spout 34. A transverse conveyer 71 is provided to receive the chaff at the discharge end of the return grain pan and near the opening to the trunk 35 and deliver it to the elevator 69 from whence it is blown back into the threshing cylinder. With this automatic chaff elevator there is no danger of a broken tooth being returned to the cylinder and causing damage therein. The elevator is very simple and effective utilizing a portion of the blast from one of the blowers at the end of the cylinder.

I claim as my invention:

1. In a separator, a cylinder and concave and stacking device located at one end of the separator casing, a motor located at the other end of the casing to relieve it from the dust and tailings delivered to the stacker, a straw rack having its receiving end next to the concave and its discharge at the motor end of the casing, a return straw rack having its receiving end below the discharge end of the first rack and its discharge end next to the stacker, and a grain pan beneath each straw rack.

2. In a separator, a cylinder and concave, and band cutter and feeder located at the same end of the separator casing, a reciprocating straw rack having its receiving end next to the concave to receive the straw from the concave, a return straw rack disposed beneath the first named rack and having its receiving end at the end of the casing opposite to the end where the feeder and concave are located and its discharge end at the feeder and concave end of the casing, and a stacker located to receive the straw from the lower rack at the end at which the stacker is located, said several parts being arranged to have the straw enter the end of the casing where the feeder, concave and cylinder are located and be conducted by the first rack to the opposite end of the casing, and the second rack will receive the straw from the first rack at the opposite end of the casing to where the straw enters the casing and deliver it to the stacker at the end where the straw enters the casing and where the feeder, concave, cylinder and stacker are located.

3. In a separator, a cylinder and concave, band cutter and feeder located at the same end of the separator casing, a straw rack having its receiving end next to the concave to receive the straw from the concave and convey it to the opposite end of the casing, a return straw rack located beneath the first named straw rack and having its receiving end at the end of the casing opposite to the end where the feeder, concave and cylinder are located and its discharge end at the end of the casing where said feeder, concave and cylinder are located, and a stacker located outside of the casing at the end where the feeder, concave and cylinder are located, and a throat opening leading downwardly from the casing at the discharge end of the return rack and merging into the lower end of the stacker, substantially as described.

4. In a separator, the combination, with a casing, of a threshing cylinder and concave located at the rear end of said casing and near the top of the same, a straw trunk also located at the rear end of said casing, spouts leading thereto, blast fans connected with said spouts, a straw rack and grain pan arranged to receive material from said cylinder and deliver it to said trunk, a transverse conveyer arranged to receive the chaff from said pan, and an elevator spout connected with said conveyer and arranged to discharge into said cylinder and said elevator spout having a branch spout connected with one of said fan spouts, for the purpose specified.

5. The combination, with a separator casing, of a threshing cylinder and concave mounted in the rear end thereof, near the top of said casing, a straw rack arranged to receive the straw from said cylinder, a grain pan arranged beneath said straw rack and having a link connection therewith, a return straw rack located beneath said pan and having its receiving end in position to receive the grain from the discharge end of said first named rack, a return grain pan arranged beneath said return rack and having its receiving end in position to receive the grain from the discharge end of said first named pan the discharge ends of said return rack and pan being beneath and near said cylinder, said return rack and pan having link connections between them and means for simultaneously oscillating said racks and pans, and said return rack and pan counteracting or balancing the other rack and pan.

6. In a separator, a threshing cylinder, and concave, in combination with a grain cleaning mechanism including receiving and return racks, a stacking apparatus arranged at the same end of the machine as said cylinder and a source of power for operating said mechanism located at the opposite end of the machine to be removed from the dust and chaff discharged through the stacking apparatus.

7. In a separator, the combination with a casing, of a threshing cylinder and concave arranged at one end of the same, a grain cleaning apparatus including receiving and return straw racks and pans, a trunk and stacker apparatus located at the same end of the machine as said cylinder and concave and a source of power arranged at the opposite end of the machine and a driving connection therefor.

8. In a separator, the combination with a casing, of a threshing cylinder and concave located at one end of the machine, receiving and return straw racks and grain pans therefor, a straw trunk located at the same end of the machine as said cylinder and concave, blast fans having spout connections with said trunk, said trunk receiving the straw from said return rack, transverse conveyer arranged to receive the chaff from said return pan, elevator spout connected with said conveyer and discharging into said cylinder and said elevator spout having a branch spout connected with one of said fan pipes.

In witness whereof, I have hereunto set my hand this 23d day of April 1908.

HALVOR O. SAGENG.

Witnesses:
RICHARD PAUL,
J. A. BYINGTON.